Figure 1:
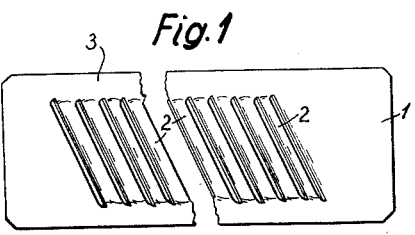

Jan. 16, 1962  A. SCHÄTZSCHOCK ET AL  3,016,600
FILING TOOL

Filed Aug. 25, 1953  4 Sheets-Sheet 1

Jan. 16, 1962  A. SCHÄTZSCHOCK ET AL  3,016,600
FILING TOOL

Filed Aug. 25, 1953  4 Sheets-Sheet 2

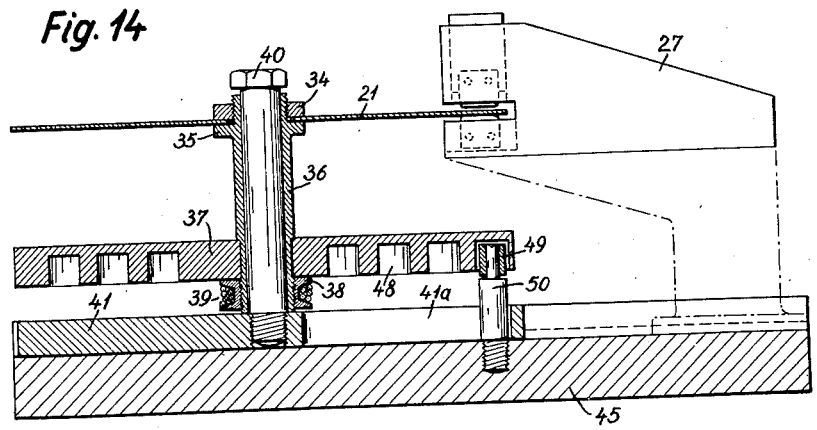
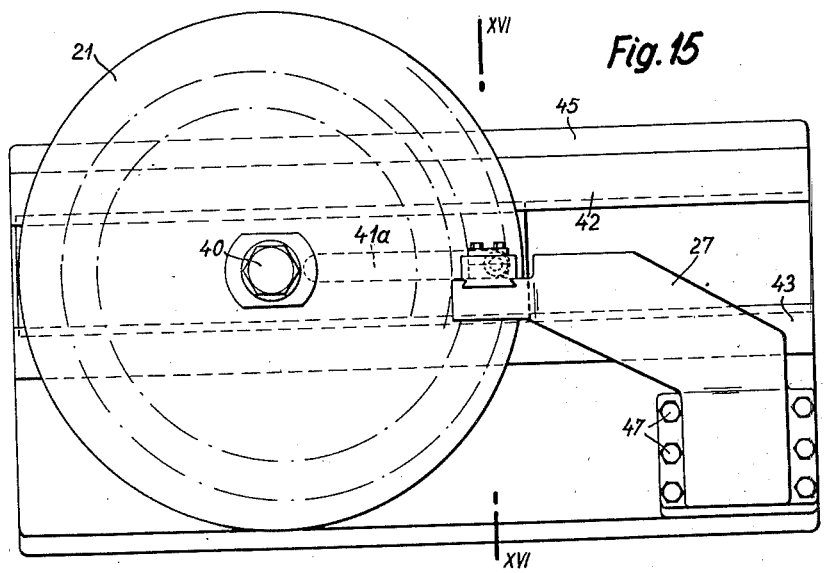

United States Patent Office 3,016,600
Patented Jan. 16, 1962

---

3,016,600
FILING TOOL
Adolf Schätzschock and Alois Weitzl, Vienna, Austria, assignors to The Stanley Works, New Britain, Conn., a corporation of Connecticut
Filed Aug. 25, 1953, Ser. No. 376,448
3 Claims. (Cl. 29—78)

The invention relates to filing tools such as filing plates for hand files or for filing machines, disc files, drum files or the like, which consist of sheet metal and which are provided with strip-shaped portions of the sheet metal bent out from the surface of the sheet, the edges of which portions form the cutting edges of the tool.

Filing plates for hand files are already known, which are produced from a metal sheet by means of a cutting and pressing operation together with subsequent hardening and sharpening. In this process, with the exception of the two marginal zones, the metal sheet is cut into cutter strips which run substantially transversely to the direction of the metal sheet. Preferably they run at the angle to the longitudinal axis which is usual during filing. The shape of the strips themselves is straight or curved. Those surfaces of the strips which previously formed the surface of the metal sheet form the faces of the cutting edges in the finished state. The severed surfaces of the strips are trimmed off during the subsequent grinding operation.

The known filing plates of this type, and their method of production, have disadvantages. Thus in order to obtain an adequate lip angle the strips must form an angle of at least 60° with the plane of the metal sheet. This also represents the cutting angle and requires a strong deformation of the portion of the metal sheet at the transition between the strips and the marginal zones of the metal sheet. As a result only high-grade material can be used. Another disadvantage consists in the fact that the cutting edges have to be produced by grinding. The grinding takes place in such a manner that the metal sheet is bent round the cylindrical surface of a grinding wheel. The clearance angle produced in this manner is very slight. The angles on the cutting edges of these filing plates lead to poorer cutting conditions than those obtained in cut files. Above all, however, it is impossible to produce disc files or drum files by the known method, because in these cases the subsequent grinding of the cutting edges cannot be carried out. The application of strip-shaped plate members provided with cutting edges has therefore been restricted to filing plates of the usual shape with a row of such strips parallel to one another. It is true that grating utensils are known having a flat or curved metal plate which is provided with numerous small bulges, the free edge of which forms a curved cutting edge, but these are not filing tools.

It is the object of the invention to overcome the drawbacks described in the known filing plates of the type already mentioned, to simplify and cheapen their manufacture, and to widen the field of application for such filing plates. It is a further object of the invention to produce similar filing tools such as disc files, abrading bands, drum files or the like.

According to the invention, the filing tools comprising a metal sheet which may be plane or arcuate, are, therefore, provided with strips bent out from the original sheet and having rhomboidal outlines. These strips are connected at their ends and inclined to the sheet and include with same an angle equal to the free angle, i.e., the angle included by the free surface or back surface of the cutter with the surface of the workpiece operated on and moreover these strips are provided along their lengthwise sides with cutting blades, the lower face of which includes with the back or upper surface an angle smaller than 90°. In the construction adjacent strips may be connected by bridges or webs in staggered relation. Independently thereof it is possible to construct the marginal zones in bandlike metal sheets angularly.

In the tools according to the invention, it is not necessary to bend the strips by an angle of at least 60° out of the original sheet surface as customary in known files, but the strips are bent to an extent that a sufficient slit between the strips for the passage of the chips originates. This angle excepting special cases amounts to about 20° and 30°. Therefore, the material of which the tool is made is not as highly stressed at the spots of transition from the sheet to the strip as in prior art files. With certainty the strips will not break at these spots.

Moreover, it is possible to produce the tools in a simpler and cheaper manner, because the surface parts disposed in the sheet prior to bending the strips after bending the strips outwardly can constitute the free or upper faces, also called back faces, and the surfaces of separation of the strips can constitute the breast or lower face of the cutting blade. In the simplified production the use of cutting devices for cutting and bending the strips suffice, a grinding or sharpening operation of the cutting blade in another manner not being necessary.

The drawing shows, by way of example, several embodiments of filing plates and cutting devices for the production of filing tools according to the invention.

Figure 3:
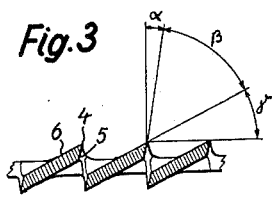
Figure 2:
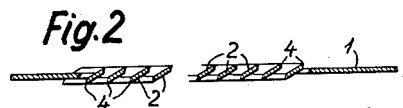
Figure 4:
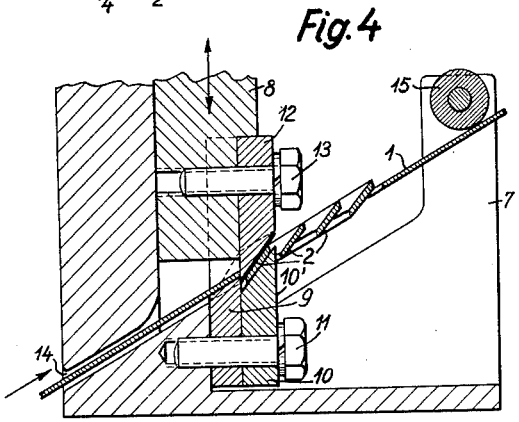
Figure 6:
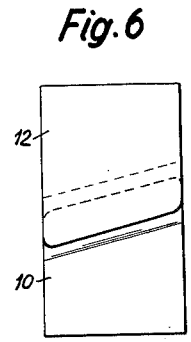
Figure 5:
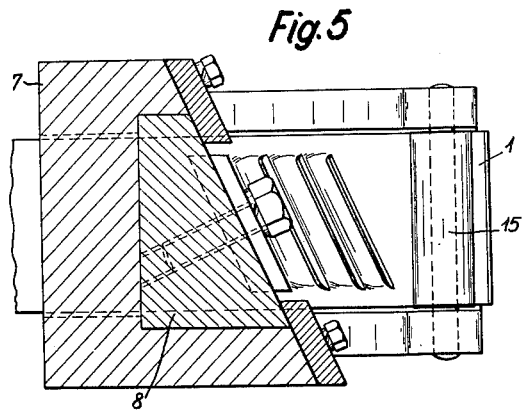
Figure 7:
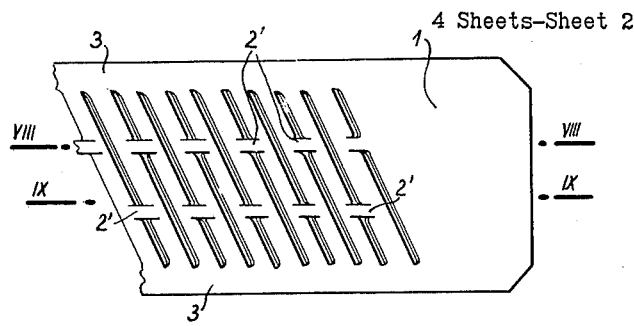
Figure 8:
Figure 9:
Figure 10:
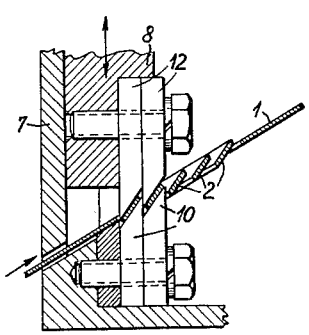
Figure 11:
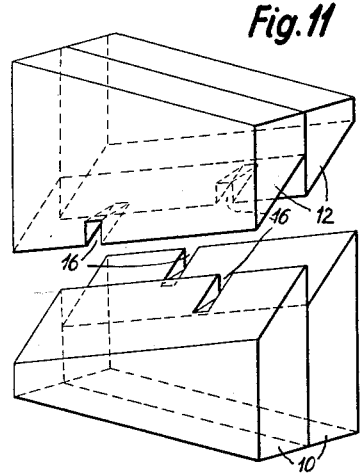
Figure 12:
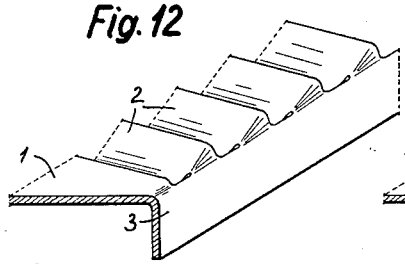
Figure 13:
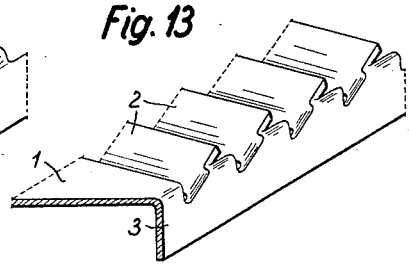
Figure 16:
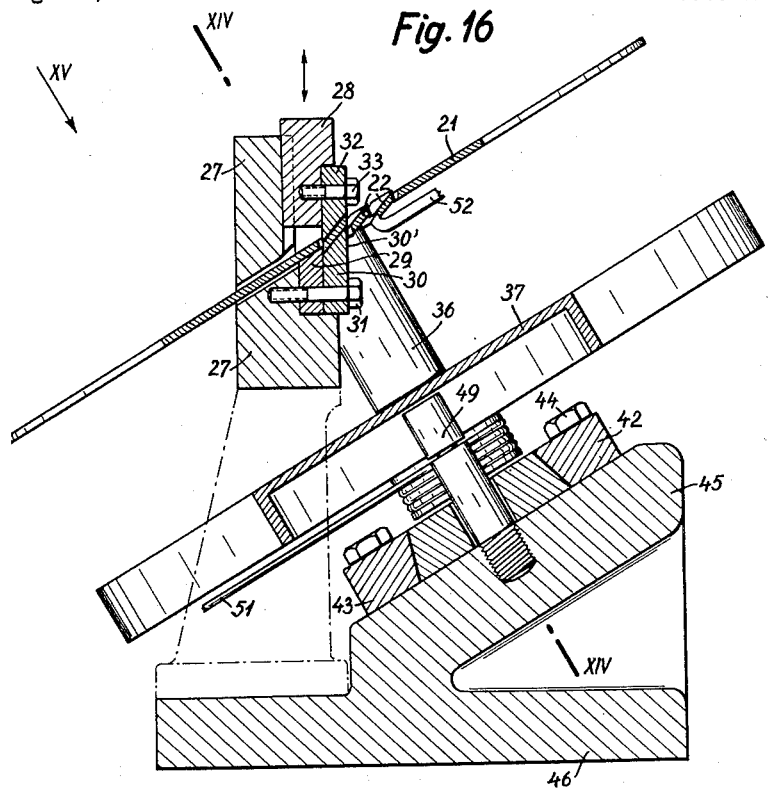
Figure 17:
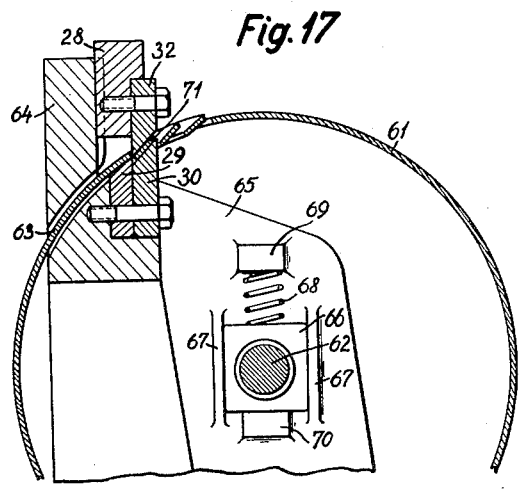

FIGURES 1 and 2 show, in plan and longitudinal section, one embodiment of a filing plate. FIGURE 3 shows a section perpendicular to the cutters on an enlarged scale. FIGURES 4 and 5 show a cutting device suitable for the production of the filing plate as shown in FIGURES 1 and 2, in vertical section and in horizontal section. FIGURE 6 shows a knife and counter-die. FIGURES 7 to 9 show another embodiment of a filing plate, in plan and cut along the lines VIII—VIII and IX—IX in FIGURE 7. FIGURES 10 and 11 show the double knife and the accompanying double counter-die mounted in the cutting device, in section and by themselves in perspective. FIGURES 12 and 13 show two further embodiments of the filing plate. FIGURES 14 to 16 show a cutting device suitable for producing a disc file, FIGURE 14 showing a section along the line XIV—XIV in FIGURE 16, FIGURE 15 a view in the direction of the arrow XV in FIGURE 16 and FIGURE 16 a section along the line XVI—XVI in FIGURE 15. Finally FIGURE 17 shows a partial cross section through a cutting device for the production of drum files.

1 represents the metal sheet out of which the strips 2 are cut at the usual angle, being connected to the marginal zones 3 of the metal sheet only at their extremities. The strips 2 are inclined at an angle of about 25° to the plane of the metal sheet 1. The outer edges 4 of these strips form the cutting edges of the filing plate. As shown in FIGURE 3, the lip or blade angle $\beta$, that is to say the angle which the face forms with the flank, is about 60° so that the cutting angle $\gamma+\beta$ that is to say the angle which the face of the cutting edge forms with the working surface of the workpiece is 85°. The severed surfaces 5 form the faces and the surfaces 6 which, before the strips were cut out formed the surface of the strip metal, represent the rakes, i.e. the flanks of the cutting edges facing the workpiece. The angle $\gamma$, which the flank of the cutting edge forms with the surface of the workpiece, hereafter called the clearance angle, is thus 25°, the face angle $\alpha$, which the face forms with the normals on the working face of the workpiece, is 5°, FIGURE 3. The lip angle of 60° is obtained by the fact that in the cutting device as shown in FIGURES 4 to 6, the metal sheet 1 is conveyed inclined at an angle of 30°. Whereas in the normal way the cutting plane, i.e. the plane in which the cutting edge of the cutting knife moves during the operation, is perpendicular to the surface of the workpiece, in the present case the surface of the metal sheet forms the said angle of about 30° with the normals on the cutting plane.

The cutting device consists of a support 7 and, guided in the support, a punch member 8 which is fixed to the press ram of a press. A knife 9 and a counter-die 10 are secured in the support 7 by means of a screw 11 and co-operate with a knife 12 which is connected to the punch member 8 by means of a screw 13. The metal sheet 1 is guided in lateral grooves 14. The front faces of the knife 12 and of the counter-die 10 are inclined in relation to the strip metal 1 by the angle of inclination of the strips 2, and are dimensioned so that, in the lowest position of the punch member 8, there is a space between these two front faces which is equal to the thickness of the metal sheet. Furthermore a roller 15 is rotatably mounted on the support and acts as a holding down device for the metal sheet. The metal sheet is fed intermittently by the press.

When the punch member 8 descends, the knife 12 severs a cutter 2 up to the connecting parts with the marginal zone of the metal sheet 1 and, as it reaches its lower dead position, causes the twisting of the cutter into a position inclined in relation to the metal sheet. As the punch member 8 rises, after the knife 12 has cleared the metal sheet 1, the latter is fed forward one step, whereupon the severed face of the cutter 2 rests against the face 10' of the counter-die 10 and positions the metal sheet for the beginning of the next cutting operation by the knife 12.

The cutting edges of the knife and of the counter-die are rounded at the ends as shown in FIGURE 6. By these means a more gentle transition from the cutter 2 to the marginal zones 3 of the metal sheet 1 is achieved.

In the wider filing plates, the strength of the cutters is insufficient to prevent a greater deflection than is permissible. This strength could only be achieved by making the cutters wider, that is to say by making the pitch coarser. In order to avoid this, adjacent cutters are joined together by staggered links 2', as shown in FIGURES 7 to 9.

In order to produce such filing plates, a cutting device as shown in FIGURE 10 is used, in which two knives 12 and two counter-dies 10 are provided. The cutting edges of these knives and counter-dies, which in other respects have the same shape as those in the cutting device shown in FIGURE 4, are provided with two grooves 16 which are staggered in relation to one another.

In the files as shown in FIGURES 12 and 13, the marginal edges of the metal sheet are bent down at right angles to enable recessed workpieces to be machined. For this the metal sheet 1 is first bent over and then stamped in the usual manner in one of the cutting devices described, to form a filing plate. For the production of the filing plate as shown in FIGURE 12, the knife and counter-die are equally wide and this width corresponds to the full length of the strips 2 between the inner faces of the bent over marginal zones 3. If the knife 12 is made wider than the counter-die 10 by twice the thickness of the metal sheet, a filing plate as shown in FIGURE 13 is obtained.

After the strips 2 have been stamped, they are hardened and tempered in the known manner, according to the material used. The soft annealing of the marginal zones may be carried out as usual or as described above, whereupon the filing plate is ready for use without being ground.

The cutting device for the production of disc files, FIGURES 14 to 16, consists of a support 27 and the punch member 28 guided therein, which is rigidly connected to the press ram of a press in the usual manner. A knife 29 and a counter-die 30 are secured in the support 27 by means of a screw 31, and co-operate with a knife 32 which is connected to the punch member 28 by means of a screw 33. The front faces of the knife 32 and of the counter-die 30 are inclined in relation to a disc 21 by the angle of inclination of the strips 22, and are dimensioned so that a space equal to the thickness of the disc is left between these two front faces when the punch member 29 is in its lowest position.

The disc 21 is pressed against the boss 35 of a sleeve 36 by means of a nut 34, and is thus firmly connected thereto. At the lower end of the sleeve is a disc 37 which is fast thereon, and is secured by means of a nut 38 which has a pulley 39. The sleeve 36 is mounted on a bolt 40 which is screwed into a slide 41. The slide is guided between two guideways 42, 43 which are secured to a bed 45 by means of screws 44. This bed is inclined at about 30° to the horizontal and is made in one piece with the base plate 46, which is clamped to the press table by any suitable known means. The support 27 is either integral with the base plate or is screwed thereto by means of the screws 47 as shown in FIGURE 15.

The disc 37 is provided on its under surface with a spiral groove 48 in which is engaged a guide roller 49 which is rotatably mounted on a pin 50. This pin passes through a slot 41a in the slide 41 and is screwed into the bed 45.

In the pulley 39 a cord 51 is secured and wound up, being connected to a weight not illustrated. As a result of this weighting, the cord tends to turn the nut 38, the sleeve 36, the disc 37 and the filing disc 21 in a clockwise direction. Turning in this direction is prevented by the fact that the strip just produced is resting against the block 29. In order to enable the disc to be fed a step further and the next strip to be produced, a resilient claw 52 (FIGURE 16) is provided which is reciprocated in known manner by the press during each operation and causes the stepwise feed by gripping behind one strip each time with its hooked end.

When the punch member 28 descends, the knife 32 severs a strip 22, except for the narrow connecting parts, from the disc 21 and, as it reaches its lower dead position causes the same to twist into a position inclined in relation to the disc. During the ascent of the punch member 28, after the knife 32 has cleared the disc 21, the latter is fed forwards one step by means of the claw 52, against the pull of the cord 51, whereupon the severed surface of the cutter 22 rests against the rear face 30' of the counter-die 30 and positions the sheet at the beginning of the next cutting operation of the knife 32.

Associated with the feed of the disc file 21 is an intermittent turning of the disc 37. In the course of this, the distance between the pin 50 and the bolt 40 is reduced as a result of the spiral trace of the groove 48, and this causes a displacement of the slide 41 in the direction of the support 27. Thus with each step of the disc file in the peripheral direction there is associated a simultaneous displacement in the radial direction. In this manner the strips 22 are arranged spirally on the filing disc.

In the production of drum files, it is sufficient if the knife is displaced laterally in relation to the axis of the drum to such an extent that the tangent at the cylindrical surface of the drum forms an angle of about 30° with the horizontal as shown in FIGURE 17. The drum file 61 is mounted to rotate on a shaft 62 on the one hand and guided with the open end on a slot 63 in the tool holder 64. The latter is made in one piece with the bracket 65 which is provided with a bearing 66 for the shaft 62. This bearing is arranged for vertical displacement in the guide 67, and rests against a stop 70 while being subjected to the action of a spring 68 which rests against a projection 69.

The punch member, knife and counter-die are arranged in the tool holder 64 as described above and are connected to the press. Corresponding parts are given the same reference numerals. A claw, which is not illustrated, provides for the intermittent feed of the drum in the manner described.

The method of operation of this device is the same as that of the device shown in FIGURES 14 to 16. In order to enable the drum to be lifted when the claw pulls the cutter 71 which has just been produced over the counter-die 30, the bearing 66 for the shaft 62 which carries the drum, is made resilient at the top.

As can easily be seen, it is possible with the filing tool according to the invention, to make the cutting angle suit any particular requirements, a reduced inclination of the cutters 2, 22, 71 being associated with a reduced cutting angle. If the gaps between the cutters become too narrow as a result, this drawback is overcome by cutting out slits between the cutters.

The actual cutters 2, 22, 71 may be of any shape, e.g. they may be curved. They may also run radially or axially, or again they may deviate from this direction.

The filing plates for hand files are clamped in holders which provide a support at least for the marginal zones and have a fixed and a movable stop which co-operate with corresponding stops such as notches, bores and the like in the filing plates. The movable stop is preferably displaceable by turning the handle so that the filing plate which has been inserted can be gripped tightly.

The filing tools according to the invention are used in the same manner as milled filing tools. In addition, however, they can also be used in other spheres, as for example in food machines for comminution and grinding purposes, in cigarette lighters as flint wheels, in pencil sharpening machines as knife discs and the like.

What we claims is:

1. A filing tool comprising a metal sheet having a succession of narrow strips of the same thickness as the metal sheet but of greater width than thickness and integrally joined at their ends to the remainder of the sheet and inclined relative to the sheet with the longitudinal edges extending outwardly beyond the opposite sides of the metal sheet, each of said strips being of rhomboidal cross-section having parallel planar side faces and parallel longitudinal edges forming breast faces oblique relative to said side faces, the breast faces disposed at the respective sides of the metal sheet facing generally forwardly in the direction of movement of the tool and extending inwardly from the outer side faces of the strips, the intersections of said breast faces and outer side faces forming acute cutting edges.

2. A filing tool comprising a metal sheet having a succession of closely spaced substantially parallel narrow strips of the same thickness as the metal sheet but of greater width than thickness and integrally joined at their ends to the remainder of the sheet and inclined at an angle less than sixty degrees relative to the sheet with the longitudinal edges extending outwardly beyond the opposite sides of the metal sheet and with slots intermediate the strips having a width at least equal to the thickness of the strip, each of said strips being of rhomboidal cross-section having parallel planar side faces and parallel longitudinal edges forming breast faces oblique relative to said side faces, the breast faces disposed at the respective sides of the metal sheet facing generally forwardly in the direction of movement of the tool and extending inwardly from the outer side faces of the strips, the intersections of said breast faces and outer side faces forming acute cutting edges.

3. A filing tool comprising a metal sheet having a succession of narrow strips of the same thickness as the metal sheet but of greater width than thickness and integrally joined at their ends to the remainder of the sheet and having an angle of inclination relative to the sheet with the longitudinal edges extending outwardly beyond the opposite sides of the metal sheet, each of said strips being of rhomboidal cross-section having parallel planar side faces and parallel longitudinal edges forming breast faces oblique relative to said side faces, the breast faces disposed at the respective sides of the metal sheet facing generally forwardly in the direction of movement of the tool and extending inwardly from the outer side faces of the strips at an acute angle which is less than the complement of said angle of inclination thereby forming a positive rake, the intersections of said breast faces and outer side faces forming acute cutting edges.

References Cited in the file of this patent

UNITED STATES PATENTS

| | | |
|---|---|---|
| 250,736 | Ingalsbe | Dec. 13, 1881 |
| 279,750 | Harrison | June 19, 1883 |
| 684,416 | Berger | Oct. 8, 1901 |
| 1,470,416 | Wilson | Oct. 9, 1923 |
| 1,625,836 | Tanguay | Apr. 26, 1927 |
| 1,656,291 | Passefiume | Jan. 17, 1928 |
| 2,058,912 | Reid | Oct. 27, 1936 |
| 2,678,571 | Booth | May 18, 1954 |

FOREIGN PATENTS

| | | |
|---|---|---|
| 641,587 | France | Apr. 21, 1928 |
| 697,773 | France | Nov. 5, 1930 |
| 4,356 | Great Britain | Feb. 22, 1909 |